United States Patent [19]
Goradia et al.

[11] Patent Number: 4,932,036
[45] Date of Patent: Jun. 5, 1990

[54] SPREAD SPECTRUM SQUARING LOOP WITH INVALID PHASE MEASUREMENT REJECTION

[75] Inventors: Dhanvant H. Goradia, Charlottesville; Fred W. Phillips; Gregory Schluge, both of Afton, all of Va.

[73] Assignee: Sperry Marine Inc., Charlottesville, Va.

[21] Appl. No.: 318,583

[22] Filed: Mar. 3, 1989

[51] Int. Cl.⁵ ............................................. H04K 1/00
[52] U.S. Cl. ....................................... 375/1; 328/155
[58] Field of Search ................. 328/155; 375/1, 119, 375/120

[56] References Cited

U.S. PATENT DOCUMENTS

| | | | |
|---|---|---|---|
| 4,214,209 | 7/1980 | Baier et al. | 375/1 |
| 4,222,013 | 9/1980 | Bowers et al. | 328/155 |
| 4,418,318 | 11/1983 | Swagerty et al. | 328/155 |
| 4,630,283 | 12/1986 | Schiff | 375/1 |
| 4,689,626 | 8/1987 | Hori et al. | 375/1 |

Primary Examiner—Salvatore Cangialosi
Attorney, Agent, or Firm—Seymour Levine

[57] ABSTRACT

A squaring loop for a GPS receiver locks to a carrier that is bi-phase modulated with a PRN acquisition code and a data message. The receive signal is down converted and hard limited and phase measurements are made between the rising edges of a local clock and every edge of the hard limited carrier. Phase measurements made with respect to extraneous or missing transitions resulting from the data bits that would result in phase locking instability are removed by a phase evaluation comparison. Phase measurements that are outside of limits determined in accordance with the noise characteristics of the channel are excluded thereby removing measurements that would cause the instability. The phase measurements outside the limits are resonably attributable to data bit transitions rather than to noise.

11 Claims, 2 Drawing Sheets

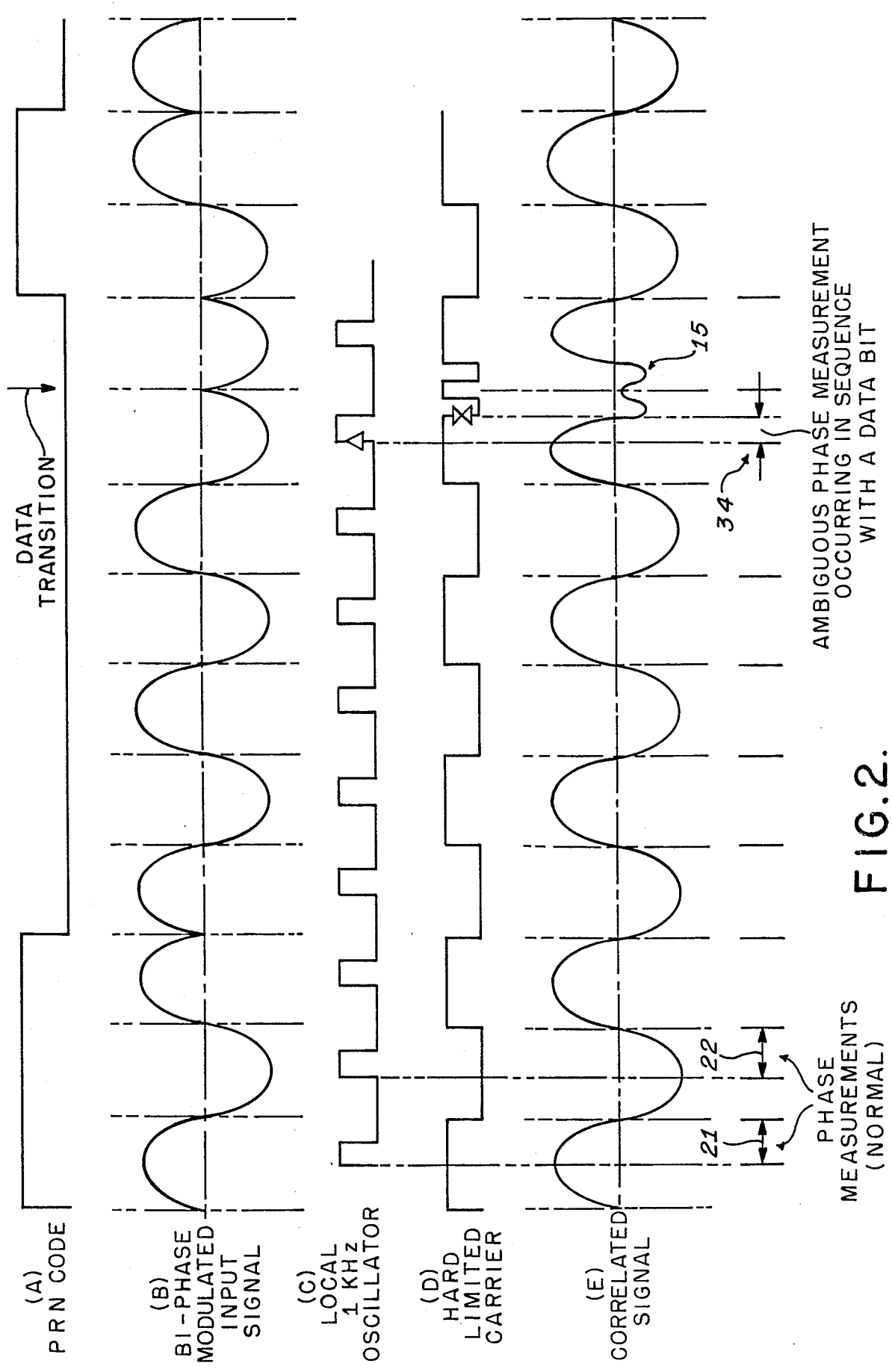

SPREAD SPECTRUM SQUARING LOOP WITH INVALID PHASE MEASUREMENT REJECTION

BACKGROUND OF THE INVENTION

1. Field of the Invention

The invention relates to spread spectrum communication, particularly with respect to phase locked loop design for the Global Positioning System (GPS).

2. Description of the Prior Art

The GPS is a navigation system utilizing a plurality of satellites in diverse orbital positions. Each satellite transmits an L-band carrier bi-phase modulated by a spectrum spreading Pseudo Random Noise (PRN) code identifying the satellite and by a 50 baud navigation data message. In the present day system, the carrier frequency is 1575.42 MHz and the PRN code has a clock rate of 1.023 MHz and a code length of 1023 bits. The code repeats the predefined sequence thereof once each millisecond.

In order to receive the GPS signal structure, a GPS receiver generates an exact duplicate of the spreading code and aligns it in time to the receive code using correlation techniques. The receiver thus removes the spreading code from the carrier (unmodulates the carrier) leaving only the bi-phase 50 baud data message thereon. The data message is used by the GPS receiving equipment to solve the navigation problem.

In order to demodulate the data message, the GPS receiver must phase lock thereto and coherently detect each bit. Conventional phase locked loops cannot lock to a biphase modulated carrier since this type of modulation has no carrier content. Biphase modulated carriers are of the suppressed carrier type with all the carrier energy in the sidebands. Two prior art designs utilized to recover the data are the Costas Loop and the Squaring Loop. These loops are discussed in detail in *Digital Communications by Satellite* by James J. Spilker, Prentice-Hall, 1977, pages 297-305. Both the Costas Loop and the Squaring Loop are of complex design requiring large numbers of components. Thus, these prior art loops tend to h=expensive and unreliable. Traditionally, the Costas Loop is far more often utilized in the GPS technology than the Squaring Loop. A Squaring Loop can track a bi-phase modulated carrier because the squaring process modulates the carrier. Particularly, the squaring process generates harmonics of which the even numbered harmonics have no modulation thereon. After squaring, the GPS receiver phase locks to the second harmonic.

SUMMARY OF THE INVENTION

A very simple form of a squaring loop is implemented by hard lifting the GPS receiver last I.F. (intermediate frequency) and making phase measurements on the next following rising or falling edge of the resulting signal with respect to a predetermined edge of a fixed local clock. Anomalies in the hard limited I.F. signal caused by the data message transitions result in extraneous and missing edges therein that result in phase tracking instability of the phase locked loop. Phase measurements outside of predetermined or adjustable limits are rejected in the phase tracking process. These rejected measurements resulted from the undesired and missing edges.

BRIEF DESCRIPTION OF THE DRAWINGS

FIG. 2 is a diagram illustrating waveforms at various points of FIG. 1.

DESCRIPTION OF THE PREFERRED EMBODIMENT

Figure 1:
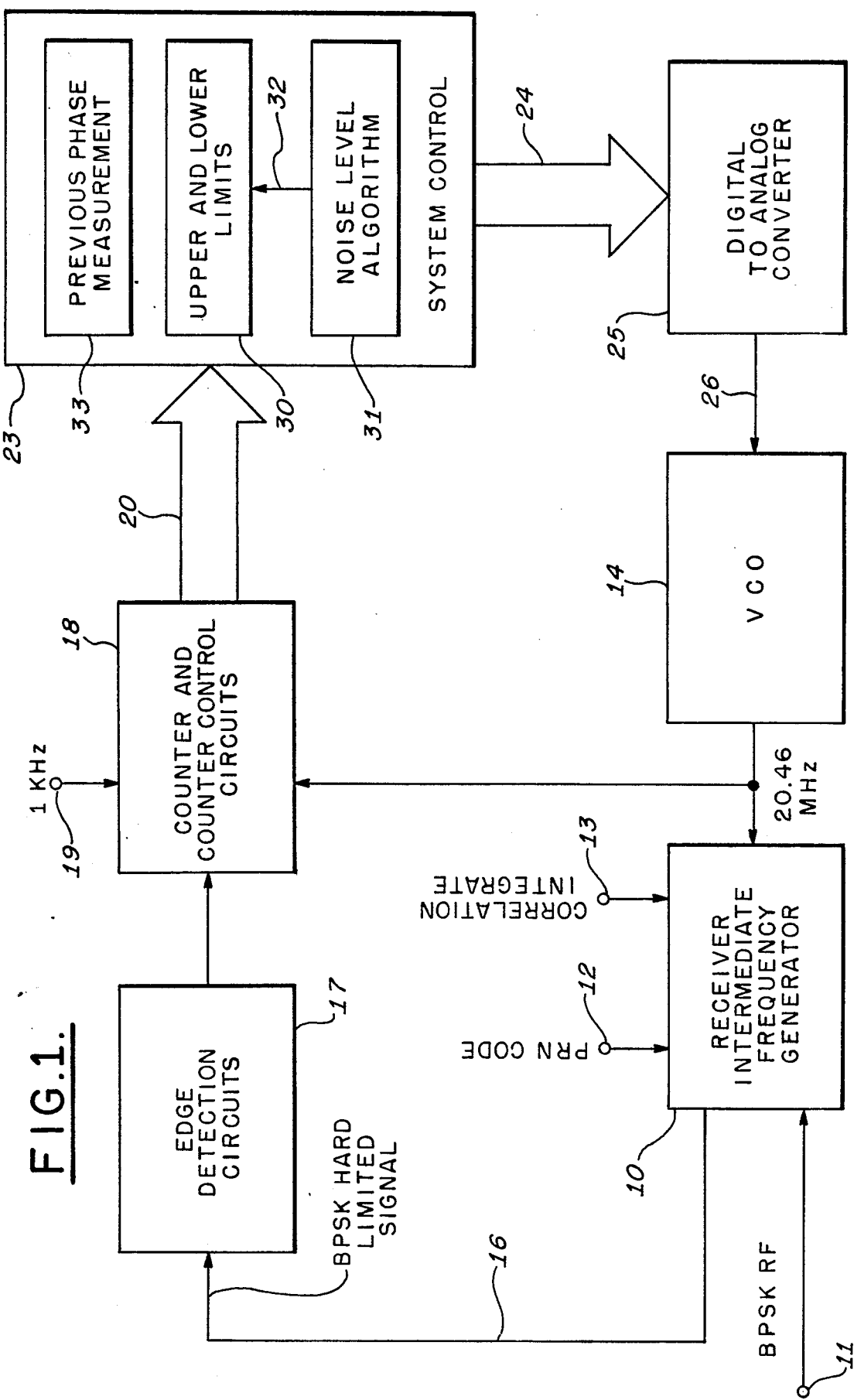
FIG. 1 is a block schematic diagram of the phase locked loop architecture utilized by the present GPS receiver including the phase detector of the present invention.

The present invention utilizes the GPS receiver of copending U.S. patent application Ser. No. 290,967, filed Dec. 28, 1988, entitled "Spread Spectrum Long Loop Receiver", by F. W. Phillips, K. L. Mahoney and E. S. Zavada. Said Ser. No. 290,967 is assigned to the assignee of the present invention and is incorporated herein in its entirety.

Referring to FIGS. 1 and 2, FIG. 1 depicts a phase locked GPS receiver loop implemented in accordance with the invention. A receiver intermediate frequency (I.F.) generator 10 receives the 1575.42 MHz bi-phase modulated input at a terminal 11. A typical bi-phase modulated input signal is illustrated as waveform B of FIG. 2. A locally generated PRN code identical to the satellite PRN code is applied via a terminal 12 to a correlator in the I.F. strip of the receiver I.F. generator 10. A typical portion of the PRN code applied to the terminal 12 is illustrated in waveform A of FIG. 2. A typical data transition of the 50 baud data message is also illustrated. The bi-phase modulation on the carrier of waveform B of FIG. 2 is added at the satellite by a PRN code identical to that of the local code signal applied to the terminal 12. A correlation integrate signal is applied at a terminal 13 to enable the operation of the internal correlator in the receiver I.F. generator 10. The receiver I.F. generator 10 receives a 20.46 MHz signal from a voltage controlled oscillator (VCO) 14. The receiver I.F. generator 10 and the VCO 14 comprise the receiver and local oscillator sections of FIG. 1 of said Ser. No. 290,967 where the VCO 14 comprises the 20.46 MHz oscillator of the local oscillator section of FIG. 1 of said Ser. No. 290,967.

The receiver I.F. generator 10 down converts the bi-phase modulated receive signal at the terminal 11 and correlates the signal against the PRN code at the terminal 12. Thus, the receiver I.F. generator 10 strips the PRN modulation from the receive signal (waveform B of FIG. 2) resulting in a correlated down converted signal exemplified by waveform E of FIG. 2. Specifically, the receiver I.F. generator 10 down converts the receive signal at the terminal 11 to a last I.F. signal of 500 Hz which is exemplified by the waveform E of FIG. 2. As described in said Ser. No. 290,967, the last I.F. signal is narrow bandpass filtered. Because of non-linear phase distortions in the GPS transmit and receive process and because of non-linear phase and asymmetrical amplitude responses of the I.F. bandpass filter, non-linear distortions occur in the bandpass filtered last I.F. signal in response to the data transitions of the 50 baud data message. Waveform E of FIG. 2 illustrates this non-linear response at 15. It is appreciated that although the data transition of FIG. 2 is illustrated as occurring at a zero crossing of the carrier of waveform B, data transitions may occur anywhere in time.

The receiver I.F. generator 10 hard limits the bandpass filtered last I.F. signal to digital TTL thresholds providing the hard limited receiver last I.F. signal on a line 16. The hard limited carrier on the line 16 is exemplified by waveform D of FIG. 2. The PRN code has been stripped from the signal but the 50 baud data message bi-phase modulation remains thereon. It is appreciated that non-linearities, such as denoted by reference numeral 15 of FIG. 2, result in anomalies comprising a number of extraneous or missing edges in the hard limited signal. Such anomalies result from the occurrence of the data transitions. Thus such anomalies can both add extra edges or eliminate edges.

The bi-phase modulated hard limited signal on the line 16 is applied to edge detection circuits 17. The circuits 17 detect the rising and falling edges of the hard limited carrier of waveform D of FIG. 2. The output of the edge detection circuit 17 is applied to counter and counter control circuits 18 which receives an input from the VCO 14 as well as a 1 KHz local oscillator clock signal applied at a terminal 19. The 1 KHz local oscillator signal at the terminal 19 is illustrated as waveform C of FIG. 2. The 1 KHz signal is the reference to which the receive signal at the terminal 11 is phase locked and is the locally generated clock to which all local time measurements are referenced. The counter and counter control circuits 18 is a phase measurement system that compares the phase of the rising edges of the 1 KHz oscillator clock to the edges detected by the circuits 17. The counter and counter control circuits 18 reset an internal counter to zero upon the occurrence of a rising edge of the 1 KHz clock and start counting the cycles of a 250 KHz clock derived from the 20.46 MHz output from the VCO 14. The count is stopped upon the next occurring edge in the hard limited carrier as detected by the circuits 17. The measurement from the rising edge of the 1 KHz clock is made to any edge of the hard limited carrier (rising or falling). The counter output is provided in parallel on a data bus 20. The circuits 17 and 18 function as an equivalent to a square law or squaring function device.

It is appreciated that these phase measurements are quantized by the 250 KHz clock derived from the VCO 14 into 4 micro second time increments and that the phase displacement range from 0° to 360° is quantized into 250 time increments. The edge detection circuits 17 and the counter and counter control circuits 18 comprise a phase detector that measures time from the rising edge of the 1 KHz clock to any edge in the hard limited I.F. signal. Typical phase measurements are illustrated in FIG. 2 at 21 and 22. The phase measurement 21 is effected with respect to a falling edge of the hard limited carrier and the phase measurement 22 is effected with respect to a rising edge of the hard limited carrier.

The phase detector 17, 18 effects high speed measurements of the phase between the 1 KHz local oscillator signal (waveform C of FIG. 2) and the hard limited carrier (waveform D of FIG. 2). The phase detector 17,18 provides a digital word on the data bus 20 representing the phase difference.

The phase measurements are effected at a 1000 Hz rate with respect to the hard limited 500 Hz I.F. signal. Thus, the phase detector 17, 18 makes phase measurements on every edge of the hard limited signal by counting time between the rising edge of the local 1 KHz oscillator and every edge of the hard limited carrier. Although the hard limiter is not a squaring device, tracking every edge of the last I.F. is mathematically equivalent to phase tracking the second harmonic of the signal. In other words, effecting phase measurements on every edge of the hard limited last I.F. is mathematically equivalent to squaring the signal. This technique results in a very simple low cost squaring loop GPS receiver implementation.

The loop is closed by applying the digital phase measurements on the data bus 20 to a system control section 23 where a reasonableness test is applied thereto by a fixed or adaptive phase evaluation in a manner and for reasons to be described. The output of the system control section 23 is applied through a data bus 24 and a digital-to-analog converter section 25 to provide a frequency control signal on a line 26 to the VCO 14. The loop locks by adjusting the phase of the VCO 14 via the signal on the line 26 to maintain the phase of the hard limited 500 Hz I.F. phase locked to the 1 KHz reference clock. With reference to FIG. 2, the phase error between the rising edges of the 1 KHz clock and the rising and falling edges of the hard limited carrier is driven to a predetermined null. The loop error signal is on the data bus 20 and the system control section 23 with digital-to-analog converter section 25 converts the digital loop error signal to an analog signal on the line 26 for controlling the VCO 14. This error signal maintains a level when the loop is locked such that the signal on the line 26 controls the VCO 14 to the precise frequency and phase to maintain the loop in lock.

The edge detection circuits 17 and the counter and counter control circuits 18 comprise a digital phase detector. For convenience in implementing the digital circuits 17, 18 and 23, the loop is designed to be in lock when the edges (rising and falling) of the hard limited carrier (waveform D of FIG. 2) are centered between the rising edges of the 1 KHz clock (waveform C of FIG. 2). This condition results in a phase reading on the bus 20 of 125. The value of 127 is actually used for convenience in performing binary arithmetic. The system control section 23 derives a tracking error for each phase measurement by subtracting 127 from the value. The system control section 23 then adjusts the oscillator control voltage on the line 26 so as to drive the tracking error to zero.

Thus, it is appreciated that zero phase error corresponds to a reading of 127 out of the phase detector 17, 18. The system control section 23 includes an upper and lower limits section 30, a noise level algorithm 31 that provides an adaptive noise level adjustment signal on a path 32 to the upper and lower limits section 30, and a previous phase measurement storage section 33 for reasons to be described. The components 17-20, 23-25, and 30-33 comprise the digital section of FIG. 1 of said Ser. No. 290,967.

The BPSK RF receive signal at the terminal 11 is received along with a high noise environment. The receive signal is a carrier in a band limited additive white gaussian noise (AWGN) channel. In the system of FIG. 1, a noiseless (infinite signal to noise ratio) receive signal would be phase tracked such that a digital phase measurement of 127 would be read on the data bus 20 every millisecond. Because of the very noisy nature of the receive signal, randomly varying measurements occur with a mean of 127 when the loop is phase locked. The measurements are randomly distributed about the mean because of the additive noise of the communications channel.

The extraneous or missing edges in the hard limited carrier on the line 16 (waveform D of FIG. 2) cause phase tracking instability in the phase locked loop of FIG. 1. This is because the phase detector 17, 18 measures time from a rising edge of the 1 KHz clock to the next occurring edge in the hard limited carrier. These undesired and missing edges cause gross errors in the phase measurement of the carrier. An ambiguous phase measurement resulting from a data transmission of the 50 baud data message is exemplified in FIG. 2 at 34. As with normal measurements, an ambiguous phase measurement resulting from a data bit is referenced to a rising edge of the 1 KHz reference clock with respect to any edge (rising or falling) of the hard limited carrier. As discussed above, these anomolous and missing edges in the hard limited carrier occur because of the non-linear phase and asymmetrical amplitude responses of the narrow bandpass filter applied to the last I.F. as well as to the non-linear phase distortions in the transmit and receive process. These non-linearities result in the distortions occurring in the hard limited carrier at data transitions. Normal phase measurements effected prior to the corruption caused by the data transitions are exemplified at 21 and 22 of FIG. 2. Such normal phase measurements are made until the data bit is introduced. The non-linear effects of the data bit produce the shortened phase measurement exemplified at 34 of FIG. 2.

The phase tracking instability in the phase locked loop of FIG. 1 caused by data transition corruption is obviated by utilizing knowledge of the receive carrier statistics in an AWGN channel. The system control section 23 examines each phase measurement from the data bus 20 and determines if this measurement is reasonable or unreasonable. Since the measurements are randomly distributed about the mean because of the additive noise of the communications channel, the variance of the noise process may be utilized to provide limits that can be applied to the phase measurement signals to determine how far from the mean a sample can be and still be reasonable. Samples beyond these limits are unreasonable and are attributable to data transitions rather than to noise. The unreasonable samples are rejected and the system control section 23 re-uses the last valid sample. Thus, the present invention provides a simple digital phase detector utilizing a priori knowledge of the communications channel statistics to differentiate valid noisy measurements from invalid data corrupted measurements. The system control section 23 applies these limits to qualify the phase measurements as valid. FIG. 2 illustrates valid phase measurements at 21 and 22 and an ambiguous phase measurement at 34. If the phase measurement at 34 were not identified and removed from the phase correction, a successful phase lock to the carrier frequency would not be possible. The system control section 23 reads the phase signal words from the phase detector 17, 18, and decides if the magnitudes are based on noise or data signals applying the appropriate phase correction to the digital-to-analog converter 25.

Thus, the simple "squaring" technique implemented in the loop of FIG. 1 is corrupted by the data message modulated on the carrier. The phase measurements would be so corrupted by the data transitions that stable tracking could not be achieved. In accordance with the invention, the system control section 23 differentiates between a valid reading and a data corrupted reading and discards readings outside of the range which is reasonable. Based on empirical measurements, data transitions result in readings on the data bus 20 as low as 0 and as high as 600. Such corrupt readings would cause the loop to break lock. Empirically, a lower limit of 20 and an upper limit of 237 are established. Readings outside of this range are invalid. Thus, in the locked condition, the digital phase measurements on the bus 20 that are utilized by the system control section 23 to control the loop are nominally 127 with readings above 237 and below 20 rejected It is thus appreciated that the limits span a time measurement interval of approximately 87% of the total time interval of measurements from 0° to 360° about the mean of 127 thus spanning a range of approximately 313° about the mean.

The upper and lower limits of 237 and 20 are stored in the upper and lower limits section 30. The system control section 23 compares the current phase measurement on the data bus 20 to these limits in the section 30. If the reading is within limits, it is stored in the previous phase measurement section 33 and utilized by the system control section 23 as a correction for the digital-to-analog converter 25. If the current phase measurement on the data bus 20 is out-of-limits, the previous phase measurement stored in the previous phase measurement section 33 is utilized by the system control section 23 as the phase correction. Thus, the system control section 23 evaluates each phase measurement on the data bus 20 to determine if it was caused by a normal transition in the carrier due to noise or to a corrupting data transition. If the section 23 determines that the measurement was a result of a data transition, it is replaced with the last valid measurement from the section 33 for application to the digital-to-analog converter 25. Thus, it is appreciated that the section 23 eliminates readings which exhibit a large error when 127 is subtracted therefrom. Such readings, if not removed, would frequently tend to cause the loop break lock.

The noise level algorithm section 31 receives all of the within limit readings to provide a statistical measure of the noise level. In nominally noisy environments, the noise level algorithm section 31 provides the adaptive noise level adjustment signal on the path 32 so that the above-described limits are set into the section 30. The noise level algorithm section 31 provides a running average of the variance of the phase readings. In low noise level environments, the signal on the line 32 may be utilized to narrow the limits in the section 30 so that the loop remains in lock with maximum phase tracking sensitivity. This would provide even greater assurance that invalid readings would be rejected. Thus, the noise level algorithm 31 can adapt to the environment within fixed ranges.

An objective of the specific embodiment of the invention described above was to maintain phase lock down to a 3 dB signal-to-noise ratio. By making several assumptions, the standard deviation (sigma) of the phase readings can be estimated. It is firstly assumed that half the noise is amplitude noise and half the noise is phase noise. A further assumption is that only the first Bessel function of the noise modulated signal has significant amplitude. This provides a 6 dB signal to double sideband phase noise ratio which corresponds to a 0.7 radian peak or 0.50 radians rms phase variation. Thus, the standard deviation of the phase readings is 0.500 radians or 28.6°. It is thus concluded that 99% (i.e. 3 sigma) of the readings will be within 86°. Referenced to the phase measurement system described above, this corresponds to an average phase locked reading of 127 with a 3 sigma variation of 120 counts. If valid readings are assumed to be within ±3 sigma, then the limits would be 7 and 247. Empirically, the above-described limits of 20 and 237 are utilized These limits correspond to ±2.70 sigma. Thus, the limits described above are established to accept noisy readings within ±2.70 sigma at a signal-to-noise ratio of 3 dB and to reject as invalid any reading outside of these limits. With the measurement system described above, 250 counts equals 180° of the 500 Hz I.F. or 1.388 counts/degree.

The loop of FIG. 1 phase locks the local clock thereof to the receive signal and utilizes the phase locked local clock to clock the PRN code applied to the terminal 12 so that the local PRN code remains synchronized with the receive code. As explained in said Ser. No. 290,967, the GPS receiver in which the present invention is utilized is of the "long loop" type. Long loop receivers track signals in a very narrow bandwidth. By phase locking the loop to the receive carrier, the local oscillators track the satellite doppler and maintain the receive signal centered in the receiver bandwidth. If the local oscillators were fixed, the receive signal would quickly drift out of the receiver bandwidth because of changing doppler shift of the satellite. The phase tracking of the present invention additionally permits demodulation of the BPSK data modulated on the receive carrier.

Compared to the prior art approaches, the present invention significantly decreases complexity, provides a simpler architecture and a higher reliability and therefore significantly reduces the cost of the system. The invention provides a simple digital phase detector which utilizes the a priori knowledge of the communications channel statistics to differentiate valid noisy measurements from invalid data corrupted measurements.

Although the above-described invention was explained in terms of phase measurements from the rising edges of the 1 KHz local oscillator to any edge of the hard limited carrier, it is appreciated that the trailing edges of the local oscillator may also be utilized as the reference point. Additionally, if the last I.F. were not hard limited, such measurements could be made to the zero crossings of the waveform (such as the waveform E of FIG. 2).

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Phase detector apparatus for use in a phase locked loop for phase locking to a receive signal in a noisy environment, said receive signal being bi-phase modulated with data bits, comprising:
   reference clock oscillator means for providing a reference clock signal with rising and falling edges,
   means for down converting said receive signal to an I.F. signal,
   means for hard limiting said I.F. signal to provide a hard limited I.F. signal with rising and falling edges and with extraneous or missing edges caused by said data bits,
   means responsive to said reference clock signal and said hard limited I.F. signal for obtaining phase measurements between predetermined edges of said reference clock signal and said edges of said hard limited I.F. signal, thereby providing a phase measurement signal,
   said phase measurement signal providing a phase locking error signal for said phase locked loop, said extraneous or missing edges causing phase locking instability, and
   phase evaluation means responsive to said phase measurement signal for removing phase measurements therefrom caused by said extraneous or missing edges that would result in said phase locking instability.

2. The apparatus of claim 1 wherein said phase evaluation means includes comparison limit means for establishing upper and lower limits above and below which, respectively, said phase measurements are removed from said phase measurement signal, said removed phase measurements being caused by said extraneous or missing edges that would result in said phase locking instability.

3. The apparatus of claim 2 wherein said phase evaluation means includes means for storing a previously valid phase measurement signal, said phase evaluation means utilizing said previously valid phase measurement signal instead of a current value of said phase measurement signal when said current value of said phase measurement signal is outside said limits.

4. The apparatus of claim 2 wherein
   said phase measurement signal exhibits a mean, and
   said upper and lower limits span a range of approximately 87% of a phase measurement range from 0° to 360° about said mean.

5. The apparatus of claim 2 wherein
   said phase measurement signal exhibits a mean, and
   said upper and lower limits span a range of approximately 313° of a phase measurement range from 0° to 360° about said mean.

6. The apparatus of claim 2 wherein
   said phase measurement signal exhibits a mean, and
   said upper and lower limits correspond to a standard deviation from said mean of ±2.70.

7. The apparatus of claim 2 wherein
   said phase measurement signal exhibits a mean of 127,
   said upper limit comprises 237, and
   said lower limit comprises 20.

8. The apparatus of claim 1 wherein said predetermined edges of said reference clock signal comprises said rising edges thereof.

9. The apparatus of claim 2 wherein said phase evaluation means includes
   noise level algorithm means responsive to said phase measurement signal for providing an adaptive adjustment signal in accordance with said noisy environment, and
   means for adjusting said upper and lower limits in accordance with said adaptive adjustment signal.

10. The apparatus of claim 9 wherein said noise level algorithm means comprises means for generating a running average of the variance of said phase measurement signal so as to provide said adaptive adjustment signal.

11. Phase detector apparatus for use in a phase locked loop for phase locking to a receive signal in a noisy environment, said receive signal being bi-phase modulated with data bits, comprising:
   reference clock oscillator means for providing a reference clock signal with rising and falling edges,
   means for down converting said receive signal to an I.F. signal having zero crossings, said I.F. signal having extraneous or missing zero crossings caused by said data bits,
   means responsive to said reference clock signal and said I.F. signal for obtaining phase measurements between predetermined edges of said reference clock signal and said zero crossings of said I.F. signal, thereby providing a phase measurement signal, said phase measurement signal providing a phase locking error signal for said phase locked loop, said extraneous or missing zero crossings causing phase locking instability, and phase evaluation means responsive to said phase measurement signal for removing phase measurements therefrom caused by said extraneous or missing zero crossings that would result in said phase locking instability.

* * * * *